(12) United States Patent
Chen et al.

(10) Patent No.: US 11,546,242 B2
(45) Date of Patent: Jan. 3, 2023

(54) LOGICAL OVERLAY TUNNEL MONITORING

(71) Applicant: VMware, Inc., Palo Alto, CA (US)

(72) Inventors: Haoran Chen, Beijing (CN); Xi Cheng, Beijing (CN); Caixia Jiang, Beijing (CN); Jingchun Jiang, Beijing (CN); Feng Pan, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 31 days.

(21) Appl. No.: 17/170,900

(22) Filed: Feb. 9, 2021

(65) Prior Publication Data
US 2022/0210040 A1 Jun. 30, 2022

(30) Foreign Application Priority Data
Dec. 30, 2020 (WO) ................ PCT/CN2020/141197

(51) Int. Cl.
*H04L 43/12* (2022.01)
*H04L 45/64* (2022.01)
*H04L 43/106* (2022.01)
*H04L 12/46* (2006.01)
*H04L 43/0852* (2022.01)

(52) U.S. Cl.
CPC .......... *H04L 43/12* (2013.01); *H04L 12/4641* (2013.01); *H04L 43/0852* (2013.01); *H04L 43/106* (2013.01); *H04L 45/64* (2013.01); *H04L 2212/00* (2013.01)

(58) Field of Classification Search
CPC ................. H04L 43/12; H04L 43/0852; H04L 43/106; H04L 45/64; H04L 12/4641
See application file for complete search history.

(56) References Cited

U.S. PATENT DOCUMENTS

| 7,940,685 | B1 * | 5/2011 | Breslau ............... H04L 43/0858 709/224 |
| 9,787,559 | B1 * | 10/2017 | Schroeder ............... H04L 43/55 |
| 2008/0151771 | A1 | 7/2008 | Dowse | |
| 2013/0100816 | A1 | 4/2013 | Bergamasco et al. | |
| 2014/0211780 | A1 | 7/2014 | Kang et al. | |
| 2014/0269327 | A1 | 9/2014 | Fulknier et al. | |
| 2016/0112182 | A1 | 4/2016 | Karnes | |

(Continued)

OTHER PUBLICATIONS

Non-Published Commonly Owned U.S. Appl. No. 17/093,517, filed Nov. 9, 2020, VMware, Inc.

*Primary Examiner* — Min Jung
(74) *Attorney, Agent, or Firm* — Su IP Consulting (57) ABSTRACT

Example methods and systems for logical overlay tunnel monitoring are described. One example may involve a first computer system obtaining control information identifying a list of multiple logical overlay tunnels to be monitored, including a first logical overlay tunnel between a first virtual tunnel endpoint (VTEP) and a second VTEP. Based on the control information, a first monitoring agent may configure and inject a probe packet at the first VTEP to cause the first VTEP to perform encapsulation and send an encapsulated probe packet over the first logical overlay tunnel. In response, an encapsulated response packet that includes a response packet may be received from the second monitoring agent over the first logical overlay tunnel. Based on the response packet, a tunnel performance metric associated with the first logical overlay tunnel may be determined.

21 Claims, 7 Drawing Sheets

(56) References Cited

U.S. PATENT DOCUMENTS

| | | |
|---|---|---|
| 2016/0226742 A1* | 8/2016 | Apathotharanan ..... H04L 45/64 |
| 2016/0315860 A1 | 10/2016 | Nichols |
| 2016/0380859 A1 | 12/2016 | Edsall et al. |
| 2017/0135009 A1* | 5/2017 | Ling ....................... H04L 43/10 |
| 2017/0223062 A1 | 8/2017 | Jing et al. |
| 2018/0255036 A1 | 9/2018 | Fiedler |
| 2019/0081877 A1 | 3/2019 | Wang et al. |
| 2019/0097934 A1 | 3/2019 | Zhang et al. |
| 2019/0109769 A1 | 4/2019 | Jain et al. |
| 2020/0021532 A1 | 1/2020 | Borikar et al. |
| 2020/0127906 A1 | 4/2020 | Malboubi et al. |
| 2020/0374228 A1 | 11/2020 | Yang et al. |
| 2021/0226875 A1 | 7/2021 | Chen et al. |
| 2021/0235313 A1 | 7/2021 | Devadoss et al. |
| 2021/0392016 A1* | 12/2021 | Boutros ................ H04L 43/106 |

* cited by examiner

LOGICAL OVERLAY TUNNEL MONITORING

CROSS-REFERENCE TO RELATED APPLICATION

The present application claims the benefit of Patent Cooperation Treaty (PCT) Application No. PCT/CN2020/141197, filed Dec. 30, 2020. The PCT application is herein incorporated by reference in its entirety.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, VMs supported by different hosts may be deployed on the same logical overlay network, or different logical overlay networks. However, traffic over logical overlay tunnels may be susceptible to various performance issues, which may affect the quality of packet flows among VMs connected via logical overlay networks.

DETAILED DESCRIPTION

According to examples of the present disclosure, logical overlay tunnel monitoring may be implemented using tunnel monitoring agents (see 181-183 in FIG. 1) based on control information (see 190 in FIG. 1) from a management entity. One example may involve a first computer system (e.g., host-A 110A) obtaining control information identifying a list of multiple logical overlay tunnels to be monitored, including a first logical overlay tunnel between a first virtual tunnel endpoint (VTEP) and a second VTEP. Based on the control information, a first monitoring agent (e.g., 181 in FIG. 1) may configure and inject a probe packet at the first VTEP for encapsulation. An encapsulated probe packet is sent over the first logical overlay tunnel towards the second VTEP and a second monitoring agent. In response, an encapsulated response packet that includes a response packet may be received from the second monitoring agent over the first logical overlay tunnel. This way, based on the response packet, a tunnel performance metric (e.g., latency measurement) associated with the first logical overlay tunnel may be determined.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Figure 1:
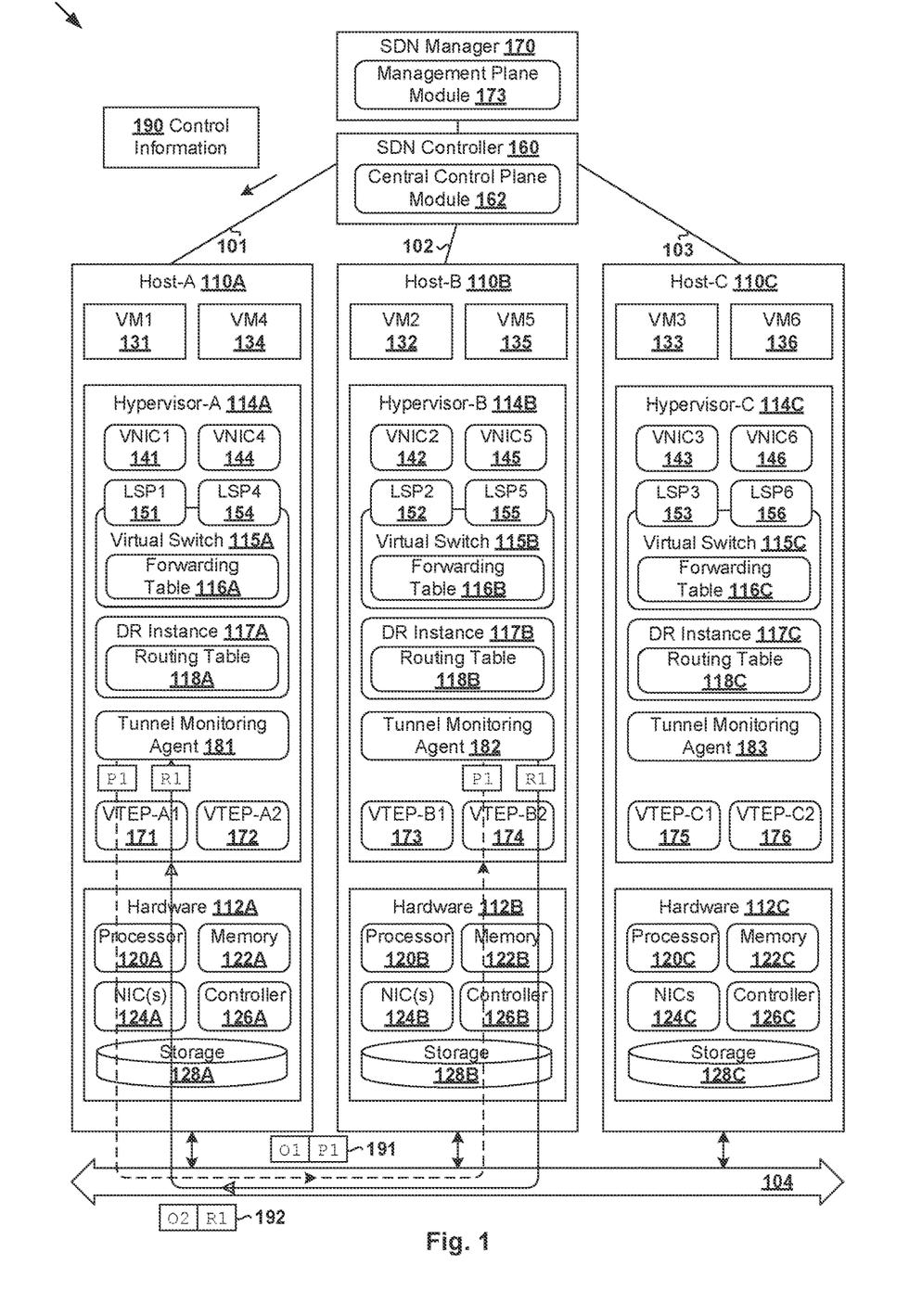
FIG. 1 is a schematic diagram illustrating an example software-defined networking (SDN) environment in which logical overlay tunnel monitoring may be performed.

FIG. 1 is a schematic diagram illustrating example software-defined networking (SDN) environment 100 in which logical overlay tunnel monitoring may be performed. Depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (known as a "host computers", "host devices", "physical servers", "server systems", "transport nodes," etc.), each host supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 164 and SDN controller 160 are example network management entities in SDN environment 100. For example, SDN manager 164 may reside on a management plane (see module 166) and SDN controller 160 on a central control plane (see module 162). To send and receive the control information (e.g., configuration information), each host 110A/110B/110C may implement local control plane (LCP) agent (not shown) to interact with SDN controller 160. For example, control-plane channel 101/102/103 may be established between SDN controller 160 and host 110A/110B/110C using TCP over Secure Sockets Layer (SSL), etc. Management entity 160/164 may be implemented using physical machine(s), virtual machine(s), a combination thereof, etc. Hosts 110A-C may also maintain data-plane connectivity with each other via physical network 104.

Through virtualization of networking services, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. For example, tunnel encapsulation may be implemented according to a tunneling protocol to extend layer-2 segments across multiple hosts. The term "logical overlay tunnel" in relation to a logical overlay network may refer generally to a tunnel established between a pair of virtual tunnel endpoints (VTEPs) over physical network 104, over which respective hosts are in layer-3 connectivity with one another.

Figure 4:
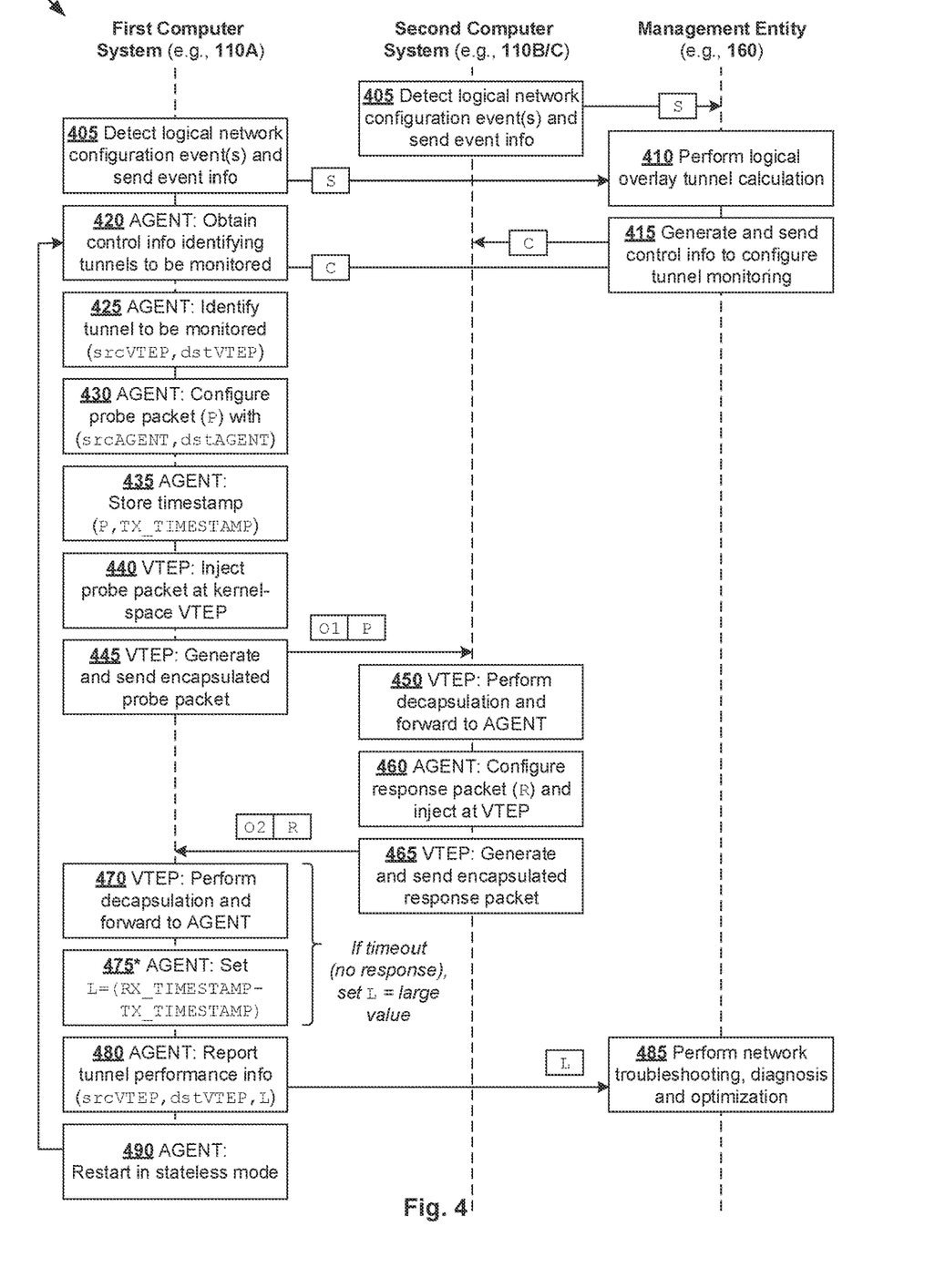
FIG. 4 is a flowchart of an example detailed process for logical overlay tunnel monitoring.

In the example in FIG. 1, hypervisor 114A/114B/114C may each implement one or more virtual tunnel endpoints (VTEPs) to encapsulate and decapsulate packets with an outer header (also known as a tunnel header) identifying a logical overlay network (e.g., VNI=5000) to facilitate communication over the logical overlay network. In general, a particular VTEP may have a 1:1 binding with PNIC 124A. To leverage the capacity of multiple physical links (e.g., spine leaf network based on equal cost multipath protocol (ECMP)), host 110A/110B/110C may be configured with multiple VTEPs to form multiple logical tunnels with another host. For example in FIGS. 1, hypervisor-A 114A implements VTEP-A1 171 and VTEP-A2 172; hypervisor-B 114B implements VTEP-B1 173 and VTEP-B2 174; and hypervisor-C 114C implements VTEP-C1 175 and VTEP-C2 176. The 1:1 binding between VTEPs 171-176 with respective PNICs is shown in FIG. 4. Encapsulated packets may be sent via a logical overlay tunnel established between a pair of VTEPs over physical network 104.

Figure 2:
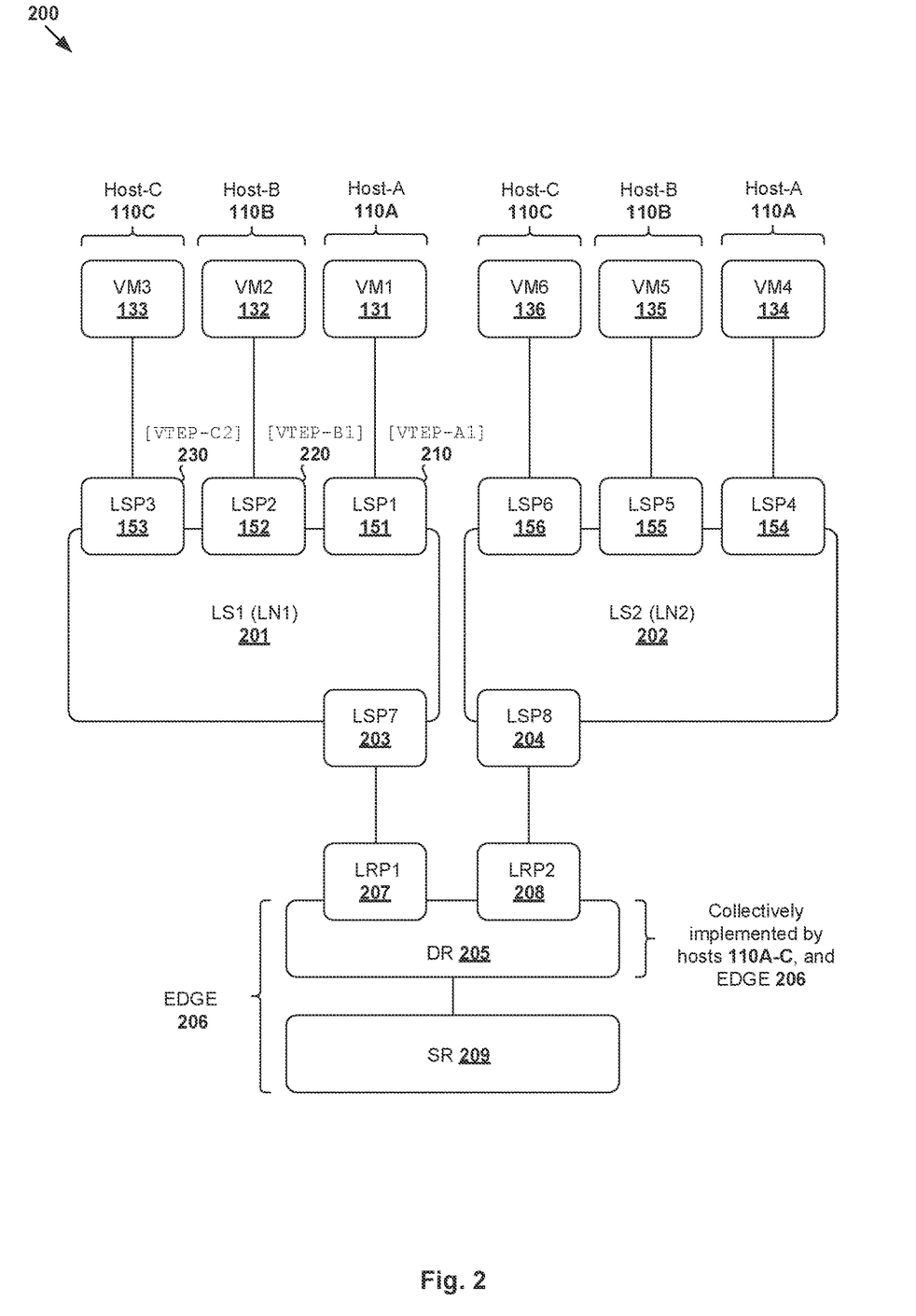
FIG. 2 is a schematic diagram illustrating an example management-plane view of logical overlay networks in the SDN environment in FIGS. 1.

Some example logical overlay networks are shown in FIG. 2, which is a schematic diagram illustrating example management plane view 200 of SDN environment 100 in FIG. 1. Here, VM1 131, VM2 132 and VM3 133 are located on a first logical layer-2 segment (i.e., logical network "LN1") associated with virtual network identifier (VNI) =5000 and connected to a first logical switch (see "LS1" 201). VM4 134, VM5 135 and VM6 136 are located on a second logical layer-2 segment (i.e., logical network "LN2")

associated with VNI=6000 and connected to a second logical switch (see "LS2" 202). With the growth of infrastructure-as-a-service (IaaS), logical overlay networks may be deployed to support multiple tenants. In this case, each logical overlay network may be designed to be an abstract representation of a tenant's network in SDN environment 100.

A logical DR (see "DR" 205) connects logical switches 201-202 to facilitate communication among VMs 131-136 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple transport nodes, such as using virtual switches 115A-C and represented internally using forwarding tables 116A-C. DR 205 may be implemented collectively by multiple transport nodes, such as using edge node 206 and hosts 110A-C. For example, DR 205 may be implemented using DR instances 117A-C and represented internally using routing tables 118A-C at respective hosts 110A-C.

Edge node 206 (labelled "EDGE1") may implement one or more logical DRs and logical service routers (SRs), such as DR 205 and SR 209 in FIG. 2. SR 209 may represent a centralized routing component that provides centralized stateful services to VMs 131-136, such as IP address assignment using dynamic host configuration protocol (DHCP), load balancing, network address translation (NAT), etc. EDGE1 206 may be implemented using VM(s) and/or physical machines ("bare metal machines"), and capable of performing functionalities of a switch, router (e.g., logical service router), bridge, gateway, edge appliance, or any combination thereof. In practice, EDGE1 206 may be deployed at the edge of a geographical site to facilitate north-south traffic to an external network, such as another data center at a different geographical site.

Depending on the desired implementation, a multi-tier topology may be used to isolate multiple tenants. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). In this case, a logical router may be categorized as one of the following types: TLR-DR, TLR-SR, PLR-DR and PLR-SR. Depending on the desired implementation, DR 205 and SR 209 may be connected via a transit logical switch (not shown in FIG. 2 for simplicity).

The virtualization of networking services generally provides improved flexibility, manageability and serviceability in relation to forwarding policy, performance and security. However, in practice, logical overlay networks are susceptible to various performance issues, which may affect the performance of applications supported by VMs 131-136. For example, some applications may have relatively stringent requirement in relation to network latency, such as applications relating to autonomous driving, video streaming, stock trading and e-commerce sales. For latency-sensitive traffic, high latency affects the quality of the applications (e.g., timely delivery of streaming data), which in turn hinders user experience and possibly leads to business loss. To facilitate health checks and network diagnosis, it is desirable to monitor logical overlay tunnels to obtain monitor their real-time performance.

Conventionally, one approach is to use bidirectional forwarding detection (BFD) for connectivity checks. However, BFD has some drawbacks and might not be suitable for all real-world scenarios. For example, BFD generally works on an uplink level, which means only latency between a source PNIC and a destination PNIC may be measured. In this case, latency incurred by some hypervisor-implemented network functions (e.g., firewall) will not be measured. In another example, since BFD is implemented using a kernel module, hypervisor context switching latency (and the associated number of applications) might not be measured. Further, BFD might be complex to implement, and require BFD session establishment and interaction with other components (e.g., VDL2 and netcpa).

Logical Overlay Tunnel Monitoring

According to examples of the present disclosure, logical overlay tunnel monitoring may be implemented in an improved manner using tunnel monitoring agents (see 181-183 in FIG. 1) based on control information (see 190 in FIG. 1) from a management entity residing on a control plane. In particular, a tunnel performance metric (e.g., latency) may be measured or determine based on a probe-response interaction between a pair of tunnel monitoring agents. Examples of the present disclosure may be implemented to reduce the complexity relating to logical overlay tunnel monitoring, such as by using a control-plane protocol for tunnel calculation and tunnel monitoring agents 181-183 for probing and latency measurement. Examples of the present disclosure should be contrasted against conventional approaches that necessitate the establishment of a BFD session (or similar protocol) for latency measurement between a pair of PNICs.

In practice, logical overlay tunnel monitoring according to examples of the present disclosure may be integrated with a network monitoring platform accessible by network administrators and developers to facilitate network diagnosis and troubleshooting. As used herein, the term "logical overlay tunnel" may refer generally to a logical connection or link that is established between a pair of VTEPs to facilitate forwarding of logical overlay network traffic. The term "logical overlay network traffic" may refer generally to encapsulated packet(s) associated with a packet flow between a pair of endpoints (e.g., VMs) that are connected via a logical overlay network that includes logical switch(es) and/or logical router(s). The pair of endpoints may be deployed on the same logical overlay network (e.g., VNI=5000) or different logical overlay networks (e.g., source VNI=5000 to destination VNI=6000). Throughout the present disclosure, various examples will be explained using host-A 110A as an example "first host" or "first computer system," host 110B/110C as "second host" or "second computer system," SDN controller 160 residing on a control plane as "management entity," etc.

Figure 3:
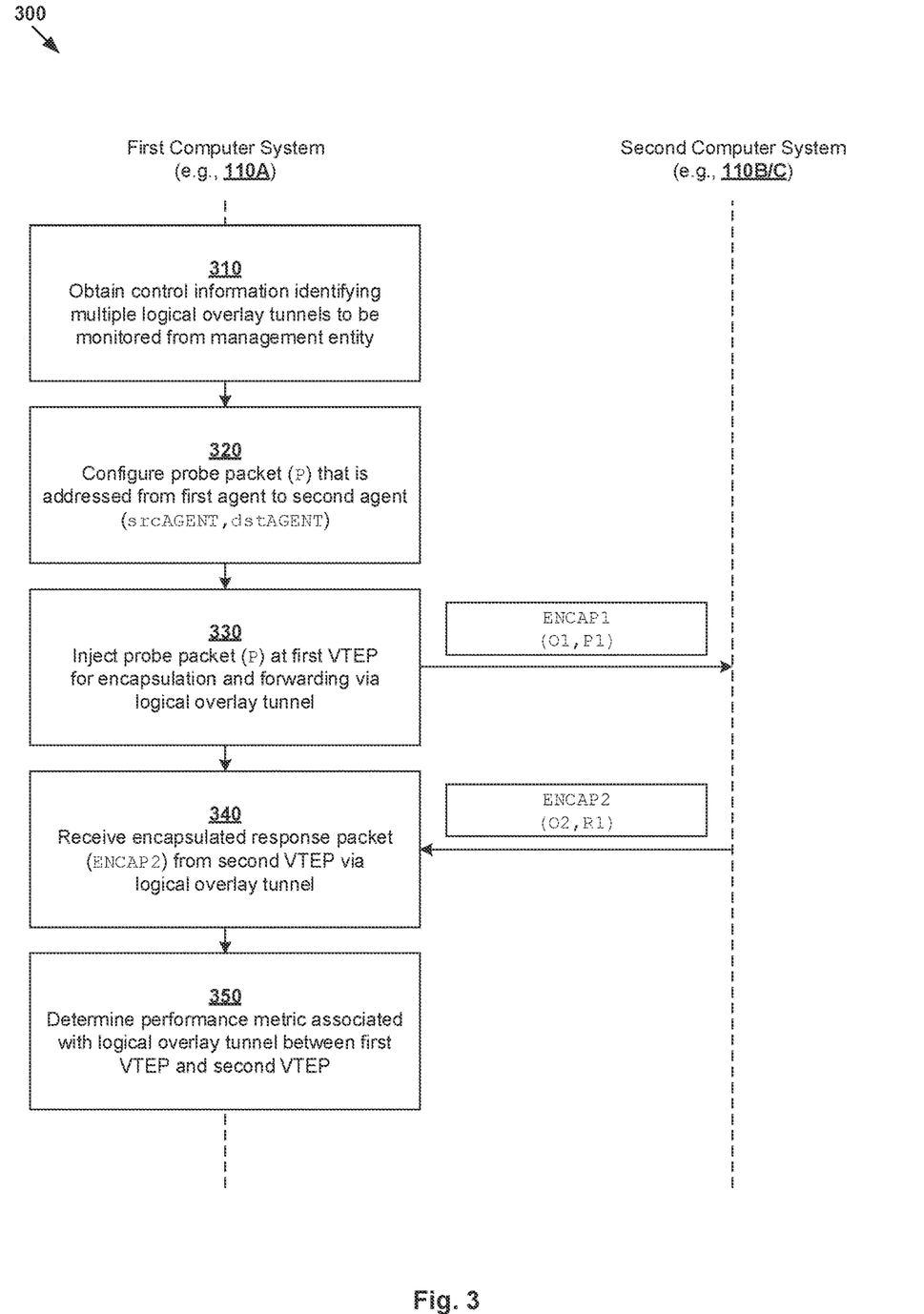
FIG. 3 is a flowchart of an example process for a first computer system to perform logical overlay tunnel monitoring.

In more detail, FIG. 3 is a flowchart of example process 300 for a computer system to perform logical overlay tunnel monitoring. Example process 300 may include one or more operations, functions, or actions illustrated by one or more blocks, such as 310 to 350. The various blocks may be combined into fewer blocks, divided into additional blocks, and/or eliminated depending on the desired implementation. In practice, example process 300 may be implemented by any suitable "computer system," such as physical host 110A/110B/110C using hypervisor 114A/114B/114C that supports latency monitor 181/182/183, etc. In practice, tunnel monitoring agent 181/182/183 may include any suitable hardware and/or software-implemented processing component(s) on host 110A/110B/110C.

At 310 in FIG. 3, host-A 110A may obtain control information (see 190 in FIG. 1) from SDN controller 160 residing on a control plane. The control information may identify a list of multiple logical overlay tunnels to be monitored. In the example in FIG. 1, the list may include a first logical overlay tunnel established between first VTEP-A1 171 and second VTEP-B2 174 on respective host-A 110A and host-B 110B. As will be discussed using FIGS. 4-5, prior to obtaining the control information, host-A 110A may generate and send to SDN controller 160 event information identifying logical network configuration event(s) associated with, for example, a logical switch port (e.g., LSP1 51) that is assigned with first VTEP-A1 171.

At 320 and 330 in FIG. 3, based on the control information, first monitoring agent 181 on host-A 110A may configure and inject a probe packet (denoted as "P1" in FIG. 1) at first VTEP-A1 171. The probe packet may be addressed from first monitoring agent 181 (e.g., source MAC address=MAC-X1) to second monitoring agent 182 on host-B 110B (e.g., destination MAC address=MAC-X2). The injection causes first VTEP-A1 171 to perform encapsulation and send an encapsulated probe packet over the first logical overlay tunnel to second VTEP-B2 174. See encapsulated probe packet (O1, P1) at 191 in FIGS. 1.

At 340 and 350 in FIG. 3, in response to receiving an encapsulated response packet from second monitoring agent 182 over the first logical overlay tunnel, first monitoring agent 181 may determine a tunnel performance metric associated with the first logical overlay tunnel. The response packet (denoted as "R1" in FIG. 1) may be addressed from second monitoring agent 182 (e.g., source MAC address=MAC-X2) to first monitoring agent 181 (e.g., destination MAC address=MAC-X1). See encapsulated probe packet (O2, R1) at 192 in FIG. 1. The tunnel performance metric may be a latency measurement such as round trip time (RTT) associated with the first logical overlay tunnel.

Depending on the desired implementation, monitoring agents 181-183 may be operating in a "user space" (or user world) of hypervisor 114A/114B/114C on host 110A/110B/110C. Monitoring agents 181-183 may be configured to interact with respective VTEPs 171-176 that operate in a "kernel space" of hypervisor 114A/114B/114C on host 110A/110B/110C. In this case, at block 330, first monitoring agent 181 (i.e., operating in a user space) may use an OS interface supported by first VTEP-A1 171 (i.e., operating in a kernel space) to perform the injection. In practice, the term "user space" may refer generally to memory and/or address space that has been allocated to application software and/or components. The term "kernel space" may generally refer to memory and/or address space that has been allocated to an OS kernel and/or OS component(s). In practice, the user space and kernel space may represent virtual memory allocations, execution contexts or address spaces that are segregated from each other.

For packets that are passed from the user space/world in which monitoring agents 181-183 are operating, respective hypervisors 114A-C are configured to pass the packets from the user space/world to a kernel space (e.g., vmkernel world) before sending the packets out onto physical network 104. Such operations are referred to as "hypervisor context switching," which may be measured as part of the RTT according to examples of the present disclosure. As such, user-space monitoring agents 181-183 should be contrasted against conventional BFD implementation that requires kernel space access and does not consider hypervisor context switching and/or routing operations that are performed in the user space during latency measurement.

As will be discussed using FIGS. 4-7, the "probe packet" may be a TCP synchronization (SYN) packet configured with a first sequence number (e.g., Y1). In this case, the "response packet" a TCP synchronization-acknowledgement (SYN-ACK) packet configured with a second sequence number (e.g., Z1) that indicates a response to the first sequence number in the SYN packet. This way, first monitoring agent 181 may identify the response packet to be a response to a particular probe packet. Encapsulated probe and response packets may be generated according to a tunneling protocol (e.g., GENEVE) associated with a logical overlay tunnel connecting a pair of VTEPs. The outer header (e.g., GENEVE header) may be addressed from a source VTEP IP address to a destination VTEP IP address. Various examples will be discussed below.

Example Tunnel Calculation

FIG. 4 is a flowchart of example detailed process 400 of logical overlay tunnel monitoring. Example process 400 may include one or more operations, functions, or actions illustrated at 410 to 490. The various operations, functions or actions may be combined into fewer blocks, divided into additional blocks, and/or eliminated depending on the desired implementation. In the following, FIG. 4 will be explained using FIG. 5, which is schematic diagram illustrating an example of tunnel calculation and control information dissemination 500.

(a) Event Information

At 405 in FIG. 4, in response to detecting logical network configuration event(s), hosts 110A-C may generate and send event information to SDN controller 160. For example, the events may include a VM (or container) connecting to a logical network (e.g., logical layer-2 or layer-3 network) via a logical switch port, the VM (or container) disconnecting from the logical network, etc. In another example, the logical network configuration event(s) may include a teaming module (not shown) assigning a VTEP for a logical switch port according to a teaming policy, such as based on source port number, source MAC address, load balancing, etc. The event information may be in the form of <logical network ID, host ID, logical port ID, local VTEP IP>.

Figure 5:
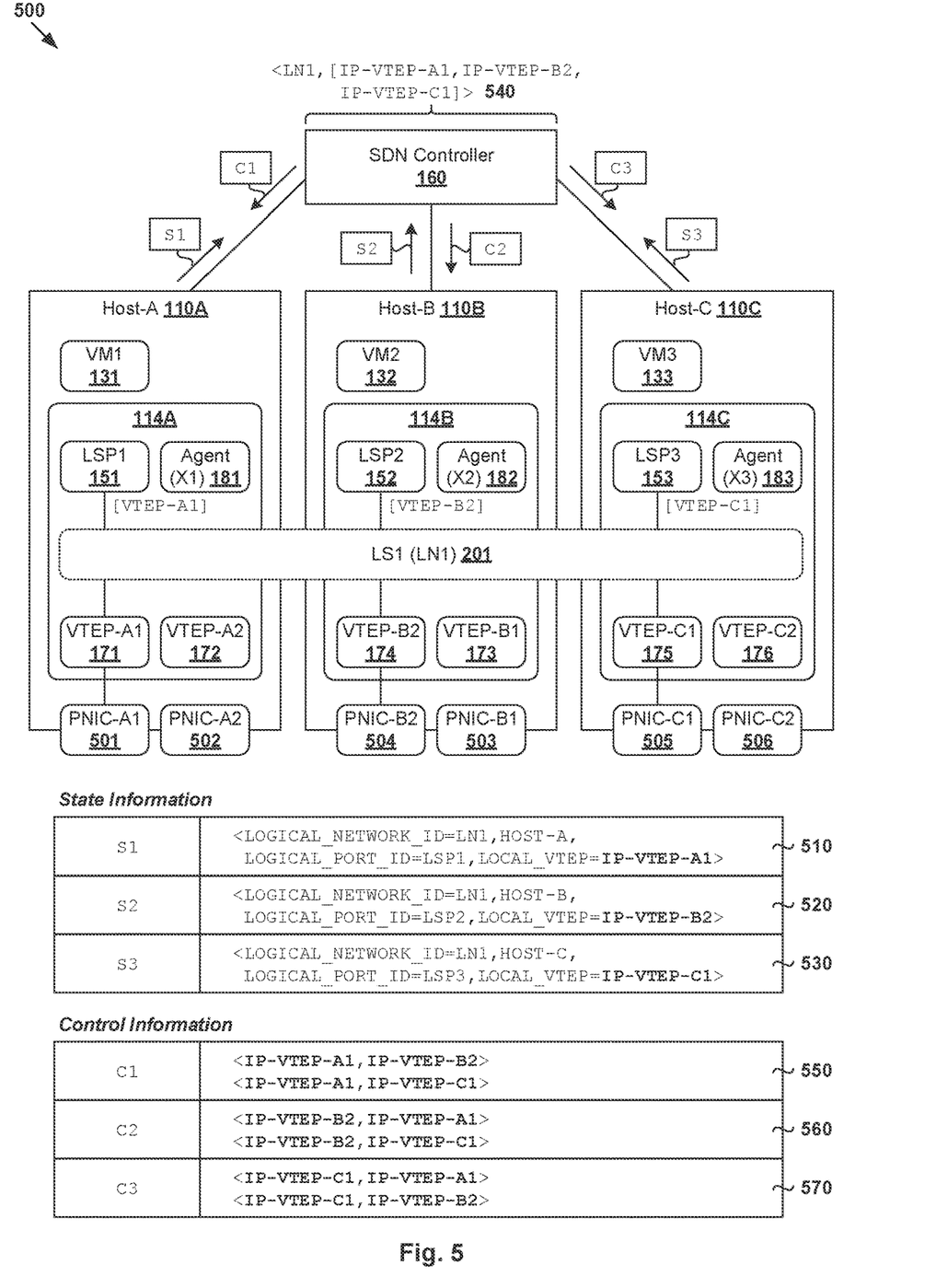
FIG. 5 is a schematic diagram illustrating an example of tunnel calculation and control information dissemination.

In the example in FIG. 5, consider a scenario where host-A 110A detects a configuration event in the form of VM1 131 attaching to logical switch=LS1 201 via logical switch port=LSP1 151 to join a first logical network=LN1. Host-A 110A is configured with multiple VTEPs, including VTEP-A1 171 having a 1:1 binding with PNIC-A1 501, and VTEP-A2 172 having a 1:1 binding with PNIC-A2 502. Based on a teaming policy, LSP1 151 may be assigned with VTEP-A1 171 to handle packet encapsulation and decapsulation for VM1 131. In this case, host-A 110A may generate and send event information associated with LSP1 151 that is assigned with VTEP-A1 171, such as <logical network ID=LN1, host ID=HOST-A, logical port ID=1, local VTEP IP=IP-VTEP-A1>. See VTEP assignment 210 in FIGS. 2 and "S1" 510 in FIG. 5.

At host-B 110B, a configuration event may be VM2 132 attaching to logical switch=LS1 201 via logical switch port=LSP2 152 to join the same logical network=LN1. Here, host-B 110B is configured with VTEP-B1 173 and VTEP-B2 174 assigned with respective PNIC-B1 503 and PNIC-B2 504. Based on a teaming policy, VTEP-B2 174 may be assigned to LSP2 152. In this case, host-B 110B may generate and send event information=<LN1, HOST-B, LSP2, IP-VTEP-B2>. See VTEP assignment 220 in FIG. 2 and "S2" 520 in FIG. 5.

Similarly, at host-C 110C, a configuration event may be VM3 133 attaching to LS1 201 via LSP3 153 to join LN1. Host-C 110C is configured with VTEP-C1 175 and VTEP-C2 176 assigned with respective PNIC-C1 505 and PNIC-C2 506. Based on a teaming policy, LSP3 153 may be assigned with VTEP-C1 175 to handle packet encapsulation and decapsulation for traffic detected via LSP3 153. In this case, host-C 110C may generate and send event information=<LN1, HOST-C, LSP3, IP-VTEP-C1>. See VTEP assignment 230 in FIG. 2 and "S3" 530 in FIG. 5.

(b) Control Information

At 410 in FIG. 4, in response to receiving event information from hosts 110A-C, SDN controller 160 may perform logical overlay tunnel calculation. For example, block 415 may involve determining a list of VTEPs that are associated with a particular logical network, such as <logical network ID=LN1> that is associated with VTEP list=<IP-VTEP-A1, IP-VTEP-B2, IP-VTEP-C1>. See 540 in FIG. 5.

At 415 in FIG. 4, based on the tunnel calculation, SDN controller 160 may configure logical overlay tunnel monitoring by generating and sending control information to hosts 110A-C. Block 420 may involve determining a list of logical overlay tunnels to be monitored for each host 110A/110B/110C based on <LN1, [IP-VTEP-A1, IP-VTEP-B2, IP-VTEP-C1]>. Control information identifying the tunnel list is then published to hosts 110A-C to configure or instruct respective monitoring agents 181-183 to perform logical overlay tunnel monitoring. Control-plane channels 101-103 may be used to push control information towards respective hosts 110A-C. If the same source and destination VTEP exist on the same host for different logical networks, duplicates will be removed.

For example, to configure logical overlay tunnel monitoring by first agent 181, control information identifying first VTEP pair=<IP-VTEP-A1, IP-VTEP-B2> and second VTEP pair=<IP-VTEP-1, IP-VTEP-C1> is sent to host-A 110A. For host-B 110B, control information identifying <IP-VTEP-B2, IP-VTEP-A1> and <IP-VTEP-B2, IP-VTEP-C1> is ent to second agent 182. For host-C 110C, control information identifying <IP-VTEP-C1, IP-VTEP-A1> and <IP-VTEP-C1, IP-VTEP-B2> is sent to third agent 182. See "C1" 550, "C2" 560 and "C3" 570 in FIG. 5.

Further, the configuration process at block 415 may be based on input information from a user (e.g., network administrator) using any suitable user interface supported by SDN manager 164, such web-based graphical user interface (GUI), command line interface (CLI), application programming interface (API), etc. Based on the input information, SDN controller 160 may perform calculation for distribution span and control information dissemination to hosts 110A-C. The user may configure tunnels for the whole network, a particular logical network, a pair of logical ports, etc. Monitoring may be triggered and stopped manually or automatically (i.e., programmatically based on stopping condition(s)).

Note that hosts 110A-C may establish logical overlay tunnels with each other at any suitable time. In the example in FIG. 5, a first logical overlay tunnel may be established between VTEP-A1 171 on host-A 110A and VTEP-B2 174 on host-B 110B. A second tunnel may be established between VTEP-A1 171 and VTEP-C1 175. A third tunnel may be established between VTEP-B2 174 and VTEP-C1 175. The tunnels may be established over physical network 104 using any suitable tunneling protocol. One example is GENEVE, which is used to establish logical overlay tunnels that act as backplanes among virtual switches 115A-B supported by respective hypervisors 114A-B. Example implementation details relating to GENEVE encapsulation may be found in a draft document entitled "Geneve: Generic Network Virtualization Encapsulation" (draft-ietf-nvo3-geneve-16) published by Internet Engineering Task Force (IETF). The document is incorporated herein by reference.

Example Probe Packets

Figure 6:
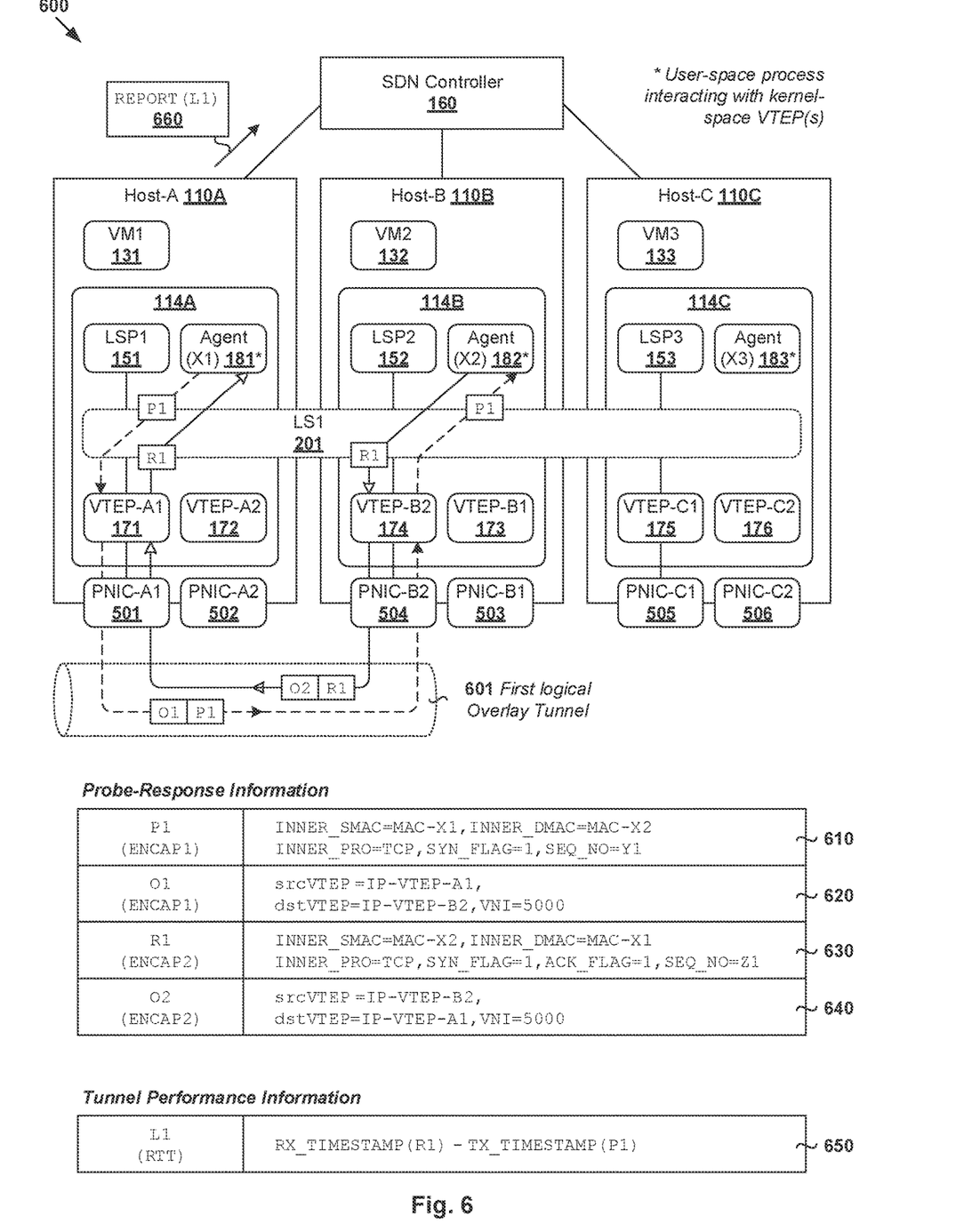
FIG. 6 is a schematic diagram illustrating a first example of logical overlay tunnel monitoring.
Figure 7:
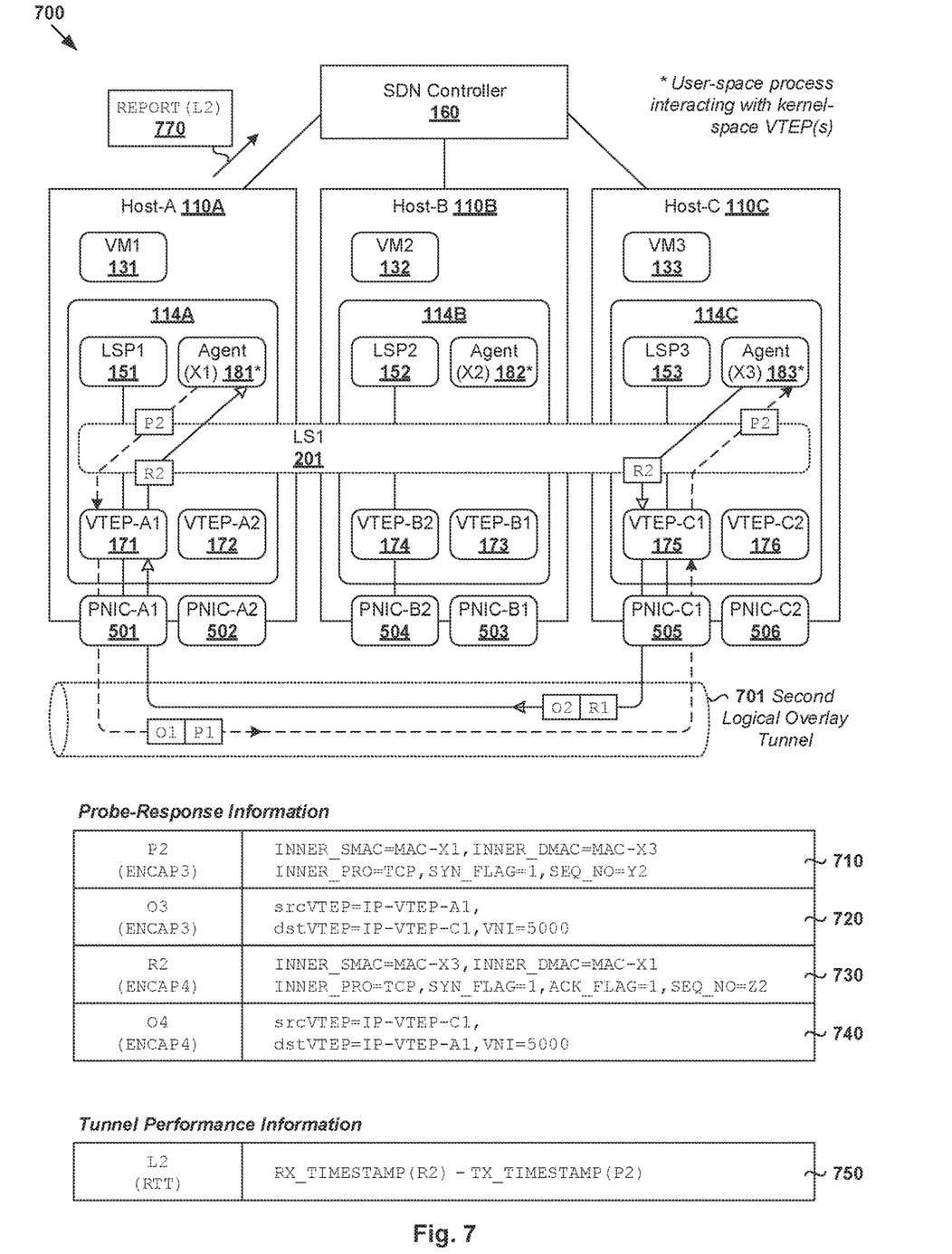
FIG. 7 is a schematic diagram illustrating a second example of logical overlay tunnel monitoring.

In the following, FIG. 4 will be explained using two example logical overlay tunnels. In particular, FIG. 6 is a schematic diagram illustrating first example 600 of logical overlay tunnel monitoring and FIG. 7 is a schematic diagram illustrating second example 700 of logical overlay tunnel monitoring. The examples below may be implemented by hosts 110A-C using, for example, respective monitoring agents 181-183 and VTEPs 171, 174-175.

At 420-425 in FIG. 4, based on control information obtained from SDN controller 160 (see "C1" 550 in FIG. 5), first monitoring agent 181 may identify multiple logical overlay tunnels to be monitored. For example, monitoring is required for a first logical overlay tunnel between VTEP-A1 171 and VTEP-B2 174 (see 601 in FIGS. 6) and a second logical overlay tunnel between VTEP-A1 171 and VTEP-C1 175 (see 701 in FIG. 7). The term "obtaining" may refer generally to first monitoring agent 181(*a*) receiving or retrieving the control information from SDN controller 160 or (b) accessing the control information from a data store accessible by both agent 181 and SDN controller 160.

At 430, 435 and 440 in FIG. 4, first monitoring agent 181 operating in a user space may configure a probe packet to monitor a particular logical overlay tunnel, store a transmit (TX) timestamp and inject the probe packet at a VTEP operating in a kernel space, such as using an OS interface supported by the VTEP. At 445, the packet injection is to cause the VTEP to perform encapsulation and send an encapsulated probe packet over the logical overlay tunnel. Two examples will be discussed below.

In a first example in FIG. 6, first monitoring agent 181 may configure a first probe packet (P1) specifying inner address information (source MAC address=MAC-X1, destination MAC address=MAC-X2) associated with respective first monitoring agent 181 and second monitoring agent 182 on host-B 110B. Depending on the desired implementation, the probe packet (P1) may be a TCP SYN packet specifying inner protocol information=TCP, SYN flag=1 and sequence number (SEQ_NO)=Y1, which may be a 32-bit value in practice. See 610 in FIG. 6.

Once injected at VTEP-A1 171, the first probe packet (P1) may be encapsulated with an outer header (O1) to generate a first encapsulated probe packet (O1, P1). To reach second monitoring agent 182, the outer header (O1) may specify outer address information (source VTEP IP address=IP-VTEP-A1, destination VTEP IP address=IP-VTEP-Bpb2) associated with respective VTEP-A1 171 and VTEP-B2 174. The outer header (O1) may also specify VNI=5000 associated with LS1 201 and LN1. The first encapsulated probe packet is then sent via PNIC-A1 501 associated with source VTEP-A1 171 towards destination VTEP-B2 174 over first logical overlay tunnel 601. See 620 in FIG. 6.

In a second example in FIG. 7, first monitoring agent 181 may configure a second probe packet (P2) specifying inner address information (source MAC-X1, destination MAC-X3) associated with respective first monitoring agent 181 and third monitoring agent 183 on host-C 110C. Similarly, the second probe packet (P2) may be a TCP SYN packet specifying inner protocol=TCP, SYN flag=1 and SEQ_NO=Y2. See 710 in FIG. 7.

Once injected at VTEP-A1 171, the second probe packet (P2) may be encapsulated with an outer header (O2) to generate a second encapsulated probe packet (O2, P2). To reach third monitoring agent 183, the outer header (O2) may specify outer address information (source IP-VTEP-A1, destination IP-VTEP-C1) associated with respective VTEP-A1 171 and VTEP-C1 175. Further, VNI=5000 associated with LS1 201 and LN1 may be specified. The second encapsulated probe packet is then sent via PNIC-A1 501 associated with source VTEP-A1 171 towards destination VTEP-C1 175 over second logical overlay tunnel 701. See 720 in FIG. 7.

Example Response Packets

At 450 in FIG. 4, in response to receiving an encapsulated probe packet, destination VTEP 174/175 may perform decapsulation and forward the (inner) probe packet towards monitoring agent 182/183 on host 110B/110C. At 460, destination monitoring agent 182/183 may configure a response packet for injection at (now source) VTEP 174/175. At 465, an encapsulated response packet is then generated and sent towards first monitoring agent 181. Two examples will be discussed below.

In the example in FIG. 6, in response to receiving the first encapsulated probe packet (O1, P1), VTEP-B2 174 on host-B 110B may perform decapsulation and forward the (inner) probe packet (P1) towards second monitoring agent 182 based on destination MAC=MAC-X2. In response, second monitoring agent 182 may configure a first response packet (R1) specifying inner address information (source MAC-X2, destination MAC-X1). The response packet (R1) may be a TCP SYN-ACK packet specifying inner protocol=TCP, SYN flag=1, ACK flag=1 and SEQ_NO=Z1 to indicate a response to SEQ_NO=Y1 in the probe packet (P1). In practice, the sequence number of the response packet (R1) is the value in the ACK field of the probe packet (P1) from source host-A 110A. The ACK number of the response packet (R1) is the value that the next sequence number in source host-A 110A. See 630 in FIG. 6.

Once injected at VTEP-B2 174, the first response packet (R1) may be encapsulated with an outer header (O2) to generate a first encapsulated response packet (O2, R1). To reach first monitoring agent 181 on host-A 110A, the outer header (O2) may specify VNI=5000 and outer address information (source IP-VTEP-B2, destination IP-VTEP-A1) associated with respective VTEP-B2 174 and VTEP-A1 171. The first encapsulated response packet is then sent via PNIC-B2 504 towards destination VTEP-A1 171 over first logical overlay tunnel 601. See 640 in FIG. 6.

In the example in FIG. 7, in response to receiving the second encapsulated probe packet (O3, P2), VTEP-C1 175 on host-C 110C may perform decapsulation and forward the (inner) probe packet (P2) towards third monitoring agent 183 based on destination MAC=MAC-X3. In response, third monitoring agent 183 may configure a response packet (R2) specifying inner address information (source MAC-X3, destination MAC-X1). The response packet (R2) may be a TCP SYN-ACK packet specifying inner protocol=TCP, SYN flag=1, ACK flag=1 and SEQ_NO=Z2 to indicate a response to SEQ_NO=Y2 in the probe packet (P2). See 730 in FIG. 7.

Once injected at VTEP-C1 175, the second response packet (R2) may be encapsulated with an outer header (O4) to generate a second encapsulated response packet (O4, R2). To reach first monitoring agent 181 on host-A 110A, the outer header (O4) may specify outer address information (source IP-VTEP-C1, destination IP-VTEP-A1) associated with respective VTEP-C1 175 and VTEP-A1 171. The outer header (O4) may also specify VNI=5000. The encapsulated response packet is then sent via PNIC-C1 505 towards VTEP-A1 171 on host-A 110A over second logical overlay tunnel 701. See 740 in FIG. 7.

Example Latency Measurement and Use Cases

At 470 in FIG. 4, in response to receiving encapsulated response packet 640/740, VTEP-A1 171 may perform decapsulation and forward or dispatch the (inner) response packet 630/730 towards first monitoring agent 181. In both examples in FIGS. 6-7, inner response packet is dispatched based on destination MAC=MAC-X1 associated with first monitoring agent 181. Next, at 475 in FIG. 4, first monitoring agent 181 may determine a performance metric, such as latency measurement in the form of RTT that does not require any time synchronization between a pair of hosts.

In the example in FIG. 6, first monitoring agent 181 may identify that response packet (R1) 630 with SEQ_NO=Z1 is a response to probe packet (P1) 610 with SEQ_NO=Y1. In this case, a receive (RX) timestamp may be recorded for first response packet (R1) 630. The RTT associated with first logical overlay tunnel 601 may be calculated as a difference between (a) the RX timestamp and (b) the TX timestamp associated with first probe packet (P1) 610, i.e., L1=RX_TIMESTAMP(R1)−TX_TIMESTAMP(P1). See 650 in FIG. 6.

In the example in FIG. 7, first monitoring agent 181 may identify that response packet (R2) 730 with SEQ_NO=Z2 is a response to probe packet (P2) 710 with SEQ_NO=Y2. The RTT associated with second logical overlay tunnel 701 may be calculated as a difference between (a) an RX timestamp associated with response packet (R2) 730 and (b) the TX timestamp associated with second probe packet (P2) 740, i.e., L2=RX_TIMESTAMP(R2)−TX_TIMESTAMP(P2). See 750 in FIG. 7. If no response packet is received within a predetermined time period, a large latency value may be set and reported for a particular logical overlay tunnel to indicate poor performance (i.e., high latency).

At 480-485 in FIG. 4, first monitoring agent 181 may generate and send tunnel performance metric information specifying the latency measurement to SDN controller 160 for network optimization, troubleshooting and diagnosis purposes. See 650/750 in FIG. 7. In one example, if tunnel performance metric information 650/750 indicates a high roundtrip latency for second logical overlay tunnel 701, SDN controller 160 and/or a user (e.g., network administrator) may initiate a diagnostic process. SDN controller 160 may also manage placement of VMs (i.e., workloads) based on tunnel performance information 650/750. In another example, latency-sensitive applications may be deployed on host(s) based on associated tunnel performance metric 650/750.

Stateless Monitoring Agents

Depending on the desired implementation, monitoring agents 181-183 may be configured to be "stateless," which means it is not necessary for them to store all state information. Being stateless, monitoring agents 181-183 may be implemented to reduce the complexity associated with logical overlay tunnel monitoring. At 490 in FIG. 4, once first monitoring agent 181 restarts, host-A 110A may re-obtain the control information in FIG. 5, or an updated version thereof, from SDN controller 160. For example, if no change has been made, SDN controller 160 may push tunnel list=<IP-VTEP-A1, IP-VTEP-B2> and <IP-VTEP-A1, IP-VTEP-C1> to first monitoring agent 181. If tunnel monitoring is no longer required, the tunnel list may be empty. In practice, monitoring agent 181/182/183 may be configured to operate in a user space (i.e., a user-world process) of hypervisor 114A/114B/114C to interact with VTEPs operating in a kernel space. User-space monitoring agent 181/182/183 should be contrasted against conventional BFD kernel modules, which are generally more complicated to implement.

TCP Probe and Response Packets

In the above examples, TCP packets are used as probe and response packets to better reflect data center traffic that is generally TCP-based. In this case, the use of UDP packets (e.g., BFD packets) as probe and response packets may result in a different behavior or outcome compared to TCP packets. By using TCP packets, the accuracy of latency measurement may be improved. Depending on the data center traffic pattern, any other protocol (e.g., UDP) may be used for the probe and response packets.

Additionally, probe and response packets may be configured or injected with time information to facilitate latency measurement without time synchronization. For example, a probe packet may be configured to record first time information (T1) associated with the transmission of the probe packet by first monitoring agent 181. A response packet may be configured to include second time information (T3−T2), where T2 is associated with the receipt of the probe packet and T3 with the transmission of the response packet by agent 182/183. This way, a roundtrip latency may be calculated as L=(T4−T1)−(T3−T2), where T4=fourth time information associated with the receipt of the response packet by agent 181. Examples of roundtrip calculation approach have been described in a related U.S. patent application Ser. No. 17/093,517 entitled "FLOW-BASED LATENCY MEASUREMENT FOR LOGICAL OVERLAY NETWORK TRAFFIC," the content of which is incorporated herein in its entirety.

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 7. For example, the instructions or program code, when executed by the processor of the computer system, may cause the processor to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first computer system to perform logical overlay tunnel monitoring, wherein the method comprises:
obtaining, from a management entity, control information identifying a list of multiple logical overlay tunnels to be monitored, wherein the list includes a first logical overlay tunnel between a first virtual tunnel endpoint (VTEP) on the first computer system and a second VTEP on a second computer system;
based on the control information, configuring, by a first monitoring agent on the first computer system, a probe packet that is addressed from the first monitoring agent to a second monitoring agent on the second computer system;
injecting, by the first monitoring agent, the probe packet at the first VTEP to cause the first VTEP to perform encapsulation and send an encapsulated probe packet over the first logical overlay tunnel towards the second VTEP and the second monitoring agent;

receiving, from the second monitoring agent over the first logical overlay tunnel, an encapsulated response packet that includes a response packet addressed from the second monitoring agent to the first monitoring agent; and based on the response packet, determining a tunnel performance metric associated with the first logical overlay tunnel between the first VTEP and the second VTEP.

2. The method of claim 1, wherein injecting the probe packet comprises:

injecting, by the first monitoring agent operating in a user space of the first computer system, the probe packet at the first VTEP operating in a kernel space of the first computer system.

3. The method of claim 1, wherein configuring the probe packet comprises:

configuring a synchronization (SYN) packet to cause the second monitoring agent to configure a synchronization-acknowledgement (SYN-ACK) packet, wherein the SYN packet is the probe packet, the SYN-ACK packet is the response packet, and the SYN-ACK packet specifies a second sequence number to indicate a response to a first sequence number in the SYN packet.

4. The method of claim 1, wherein configuring the probe packet comprises:

configuring address information to address the probe packet from (a) a first Media Access Control (MAC) address associated with the first monitoring agent to (b) a second MAC address associated with the second monitoring agent to cause the second VTEP to forward the probe packet towards the second monitoring agent.

5. The method of claim 1, wherein determining the tunnel performance metric comprises:

determining a latency measurement associated with the first logical overlay tunnel based on a transmit (TX) timestamp associated with the probe packet and a receive (RX) timestamp associated with the response packet.

6. The method of claim 1, wherein the method further comprises:

prior to obtaining the control information, generating and sending event information to the management entity, wherein the event information identifies a logical network configuration event associated with a logical switch port that is assigned with the first VTEP.

7. The method of claim 1, wherein the method further comprises:

in response to restarting the first monitoring agent on the first computer system, re-obtaining the control information, or an updated version of the control information, from the management entity, wherein the first monitoring agent is a stateless agent.

8. A non-transitory computer-readable storage medium that includes a set of instructions which, in response to execution by a processor of a first computer system, cause the processor to perform a method of logical overlay tunnel monitoring, wherein the method comprises:

obtaining, from a management entity, control information identifying a list of multiple logical overlay tunnels to be monitored, wherein the list includes a first logical overlay tunnel between a first virtual tunnel endpoint (VTEP) on the first computer system and a second VTEP on a second computer system;

based on the control information, configuring, by a first monitoring agent on the first computer system, a probe packet that is addressed from the first monitoring agent to a second monitoring agent on the second computer system;

injecting, by the first monitoring agent, the probe packet at the first VTEP to cause the first VTEP to perform encapsulation and send an encapsulated probe packet over the first logical overlay tunnel towards the second VTEP and the second monitoring agent;

receiving, from the second monitoring agent over the first logical overlay tunnel, an encapsulated response packet that includes a response packet addressed from the second monitoring agent to the first monitoring agent; and based on the response packet, determining a tunnel performance metric associated with the first logical overlay tunnel between the first VTEP and the second VTEP.

9. The non-transitory computer-readable storage medium of claim 8, wherein injecting the probe packet comprises:

injecting, by the first monitoring agent operating in a user space of the first computer system, the probe packet at the first VTEP operating in a kernel space of the first computer system.

10. The non-transitory computer-readable storage medium of claim 8, wherein configuring the probe packet comprises:

configuring a synchronization (SYN) packet to cause the second monitoring agent to configure a synchronization-acknowledgement (SYN-ACK) packet, wherein the SYN packet is the probe packet, the SYN-ACK packet is the response packet, and the SYN-ACK packet specifies a second sequence number to indicate a response to a first sequence number in the SYN packet.

11. The non-transitory computer-readable storage medium of claim 8, wherein configuring the probe packet comprises:

configuring address information to address the probe packet from (a) a first Media Access Control (MAC) address associated with the first monitoring agent to (b) a second MAC address associated with the second monitoring agent to cause the second VTEP to forward the probe packet towards the second monitoring agent.

12. The non-transitory computer-readable storage medium of claim 8, wherein determining the tunnel performance metric comprises:

determining a latency measurement associated with the first logical overlay tunnel based on a transmit (TX) timestamp associated with the probe packet and a receive (RX) timestamp associated with the response packet.

13. The non-transitory computer-readable storage medium of claim 8, wherein the method further comprises:

prior to obtaining the control information, generating and sending event information to the management entity, wherein the event information identifies a logical network configuration event associated with a logical switch port that is assigned with the first VTEP.

14. The non-transitory computer-readable storage medium of claim 8, wherein the method further comprises:

in response to restarting the first monitoring agent on the first computer system, re-obtaining the control information, or an updated version of the control information, from the management entity, wherein the first monitoring agent is a stateless agent.

15. A computer system, being a first computer system, comprising:
- a first virtual tunnel endpoint (VTEP) to establish a first logical overlay tunnel with a second VTEP on a second computer system; and
- a first monitoring agent configured to:
    - obtain, from a management entity, control information identifying a list of multiple logical overlay tunnels to be monitored, wherein the list includes a first logical overlay tunnel between the first VTEP and the second VTEP;
    - based on the control information, configure a probe packet that is addressed from the first monitoring agent to a second monitoring agent on the second computer system;
    - inject the probe packet at the first VTEP to cause the first VTEP to perform encapsulation and send an encapsulated probe packet over the first logical overlay tunnel towards the second VTEP and the second monitoring agent;
    - receive, from the second monitoring agent over the first logical overlay tunnel, a response packet that is addressed from the second monitoring agent to the first monitoring agent; and
    - based on the response packet, determine a tunnel performance metric associated with the first logical overlay tunnel between the first VTEP and the second VTEP.

16. The computer system of claim 15, wherein injecting the probe packet comprises the first monitoring agent performing the following:
- inject, by the first monitoring agent operating in a user space of the first computer system, the probe packet at the first VTEP operating in a kernel space of the first computer system.

17. The computer system of claim 15, wherein configuring the probe packet comprises the first monitoring agent performing the following:
- configure a synchronization (SYN) packet to cause the second monitoring agent to configure a synchronization-acknowledgement (SYN-ACK) packet, wherein the SYN packet is the probe packet, the SYN-ACK packet is the response packet, and the SYN-ACK packet specifies a second sequence number to indicate a response to a first sequence number in the SYN packet.

18. The computer system of claim 15, wherein configuring the probe packet comprises the first monitoring agent performing the following:
- configure address information to address the probe packet from (a) a first Media Access Control (MAC) address associated with the first monitoring agent to (b) a second MAC address associated with the second monitoring agent to cause the second VTEP to forward the probe packet towards the second monitoring agent.

19. The computer system of claim 15, wherein determining the tunnel performance metric comprises the first monitoring agent performing the following:
- determine a latency measurement associated with the first logical overlay tunnel based on a transmit (TX) timestamp associated with the probe packet and a receive (RX) timestamp associated with the response packet.

20. The computer system of claim 15, wherein the computer system is configured to:
- prior to obtaining the control information, generate and send event information to the management entity, wherein the event information identifies a logical network configuration event associated with a logical switch port that is assigned with the first VTEP.

21. The computer system of claim 15, wherein the computer system is configured to:
- in response to restarting the first monitoring agent on the first computer system, re-obtain the control information, or an updated version of the control information, from the management entity, wherein the first monitoring agent is a stateless agent.

* * * * *